(12) United States Patent
Hanada et al.

(10) Patent No.: US 7,788,811 B2
(45) Date of Patent: Sep. 7, 2010

(54) HAND-HELD POWER WORKING MACHINE

(75) Inventors: Kazuya Hanada, Hamura (JP); Naoyuki Kirihara, Hamura (JP); Kazuteru Fukuda, Oume (JP)

(73) Assignee: Yamabiko Corporation (JP)

( * ) Notice: Subject to any disclaimer, the term of this patent is extended or adjusted under 35 U.S.C. 154(b) by 330 days.

(21) Appl. No.: 11/949,209

(22) Filed: Dec. 3, 2007

(65) Prior Publication Data
US 2008/0134521 A1   Jun. 12, 2008

(30) Foreign Application Priority Data
Dec. 8, 2006   (JP) .............................. 2006-332180

(51) Int. Cl.
*A01D 34/13*   (2006.01)
(52) U.S. Cl. .............................. 30/216; 30/210; 74/567
(58) Field of Classification Search .................. 30/216, 30/217, 218, 219, 220, 392, 393, 394; 74/53, 74/54, 55, 567
See application file for complete search history.

(56) References Cited

U.S. PATENT DOCUMENTS

| | | | | |
|---|---|---|---|---|
| 3,802,075 A | * | 4/1974 | Taylor et al. .................. 30/216 |
| 6,170,159 B1 | | 1/2001 | Kramer et al. | |
| 6,263,579 B1 | * | 7/2001 | Nagashima .................. 30/220 |
| 6,698,177 B1 | * | 3/2004 | Akehi et al. .................. 56/236 |

FOREIGN PATENT DOCUMENTS

JP   2008-136370   *  6/2008

* cited by examiner

*Primary Examiner*—Hwei-Siu C Payer
(74) *Attorney, Agent, or Firm*—Studebaker & Brackett PC; Donald R. Studebaker

(57) ABSTRACT

A trimming machine according to the present invention has a pair of blades each of which has a plurality of cutting edges along a longitudinal direction of the blades and which are reciprocated along the longitudinal direction relative to each other by a rotary power unit. The trimming machine further has a substantially cylindrical eccentric cam eccentrically rotated by the rotary power unit, and a connecting rod having an annular larger end part slidably fitted around the eccentric cam, a smaller end part pivotally attached to one of the blades, and a connecting rod axis passing through a central axis of the smaller end part and a central axis of the larger end part. The larger end part has a bearing portion for bearing load from the blade, and the bearing portion is located on the connecting rod axis when the connecting rod axis is aligned with the longitudinal direction, and is deformable along the connecting rod axis when the bearing portion is subjected to a load.

3 Claims, 5 Drawing Sheets

HAND-HELD POWER WORKING MACHINE

FIELD OF THE INVENTION

The present invention relates to a hand-held power working machine and more particularly to a trimming machine for trimming garden trees and plants.

BACKGROUND ART

A kind of a trimming machine for trimming garden trees and plants, namely a hedge trimmer, is known, which trimming machine includes a pair of cutter blades, each cutter blade having a plurality of cutting edges along its longitudinal direction and driven by a rotary power unit so as to allow the pair of the blades to reciprocate in opposite directions relative to each other. Further, a kind of such a trimming machine is known, which trimming machine uses an eccentric cylindrical cam eccentrically rotated by the rotary power unit in combination with a connecting rod having a larger end part slidably fitted around the eccentric cam in order to convert a rotational motion of the rotary power unit into a reciprocating motion of the pair of the cutter blades. Such a trimming machine is disclosed, for example, in FIG. 9 in the Japanese Patent Publication No. 2966382 to Kramer et al.

When such a conventional trimming machine is worked for a long time, wear may be caused between the larger end part of the connecting rod and the eccentric cam. The trimming machine disclosed in the Kramer et al. has a grease reservoir between the larger end part and the eccentric cam, which grease reservoir makes a certain effect of reducing a frictional force between contact surfaces of the larger end part and the eccentric cam due to lubrication therebetween. However, since an active force itself causing such a friction force is not reduced regardless of the lubrication and the reservoir cannot be a useful means for equalizing an uneven distribution of the frictional force associated with the rotation of the eccentric cam, a need for reducing wear caused between the larger end part of the connecting rod and the eccentric cam still exists.

Thus, an object of the present invention is to provide a trimming machine in which wear caused between the larger end part of the connecting rod and the eccentric cam can be reduced.

SUMMARY OF THE INVENTION

To achieve the above-stated object, a trimming machine according to the present invention having a pair of blades each of which has a plurality of cutting edges along a longitudinal direction of the blades and which are reciprocated along the longitudinal direction relative to each other by a rotary power unit, comprises a substantially cylindrical eccentric cam eccentrically rotated by the rotary power unit; and a connecting rod having an annular larger end part slidably fitted around the eccentric cam, a smaller end part pivotally attached to one of the blades, and a connecting rod axis passing through a central axis of the smaller end part and a central axis of the larger end part, wherein the larger end part has a bearing portion located on the connecting rod axis for bearing load from the blade when the connecting rod axis is aligned with the longitudinal direction, and the bearing portion is deformable along the connecting rod axis when the bearing portion is subjected to a load.

In this trimming machine, when the pair of blades is reciprocated relative to each other, garden trees and so on are trimmed by the cutting edges. A load caused when the garden trees and so on are trimmed is transferred to the eccentric cam via the larger end part of the connecting rod. Such a load is applied to the bearing portion of the larger end part located on the connecting rod axis especially when and just before the connecting rod axis is aligned with the longitudinal direction. The bearing portion subjected to the load is deformed along the connecting rod axis. This allows a contact area between the bearing portion and the eccentric cam to be expanded or increased circumferentially so that a frictional force caused by the load can be distributed in an expanded area, causing to reduce a pressure acting between the bearing portion and the eccentric cam. Consequently, wear caused between the larger end part and the eccentric cam can be reduced.

In the prior-art trimming machine, the larger end part of the connecting rod is designed to be rigid so that such a deformation of the connecting rod due to the load is reduced as much as possible. The inventor of the present invention has made the above-stated structure by analyzing the loads applied to the connecting rod from the cutter blades in detail.

In an embodiment of the trimming machine according to the present invention, preferably, the connecting rod further has a transverse axis passing through the central axis of the larger end part and extending perpendicular to the connecting rod axis and the central axis of the larger end part, the larger end part has a side portion located on the transverse axis, and a radial width of the bearing portion is smaller than a radial width of the side portion.

In this trimming machine, the deformation of the bearing portion can be achieved by forming the bearing portion so that the radial width thereof is smaller than that of the side portion.

In the embodiment, preferably, the eccentric cam has a peripheral cutout located on the transverse axis when the connecting rod axis is aligned with the longitudinal direction.

In this trimming machine, the peripheral cutout is provided at a location of the eccentric cam to which only less load acts, namely, at a location of the eccentric cam on the transverse axis when the connecting rod axis is aligned with the longitudinal direction. The peripheral cutout and the larger end part of the connecting rod define a space in which grease can be stored. Consequently, wear caused between the larger end part of the connecting rod and the eccentric cam can be further reduced.

Further, to achieve the above-stated object, a trimming machine according to the present invention having a pair of blades each of which has a plurality of cutting edges along a longitudinal direction of the blades and which are reciprocated along the longitudinal direction relative to each other by a rotary power unit, comprises a substantially cylindrical eccentric cam eccentrically rotated by the rotary power unit; and a connecting rod having an annular larger end part slidably fitted around the eccentric cam, a smaller end part pivotally attached to one of the blades, a connecting rod axis passing through a central axis of the smaller end part and a central axis of the larger end part, and a transverse axis passing through the central axis of the larger end part and extending perpendicular to the connecting rod axis and the central axis of the larger end part, wherein the eccentric cam has a peripheral cutout located on the transverse axis when the connecting rod axis is aligned with the longitudinal direction.

As described above, according to the trimming machine of the present invention, wear caused between the connecting rod and the eccentric cam can be reduced.

DESCRIPTION OF THE PREFERRED EMBODIMENTS

Figure 1:
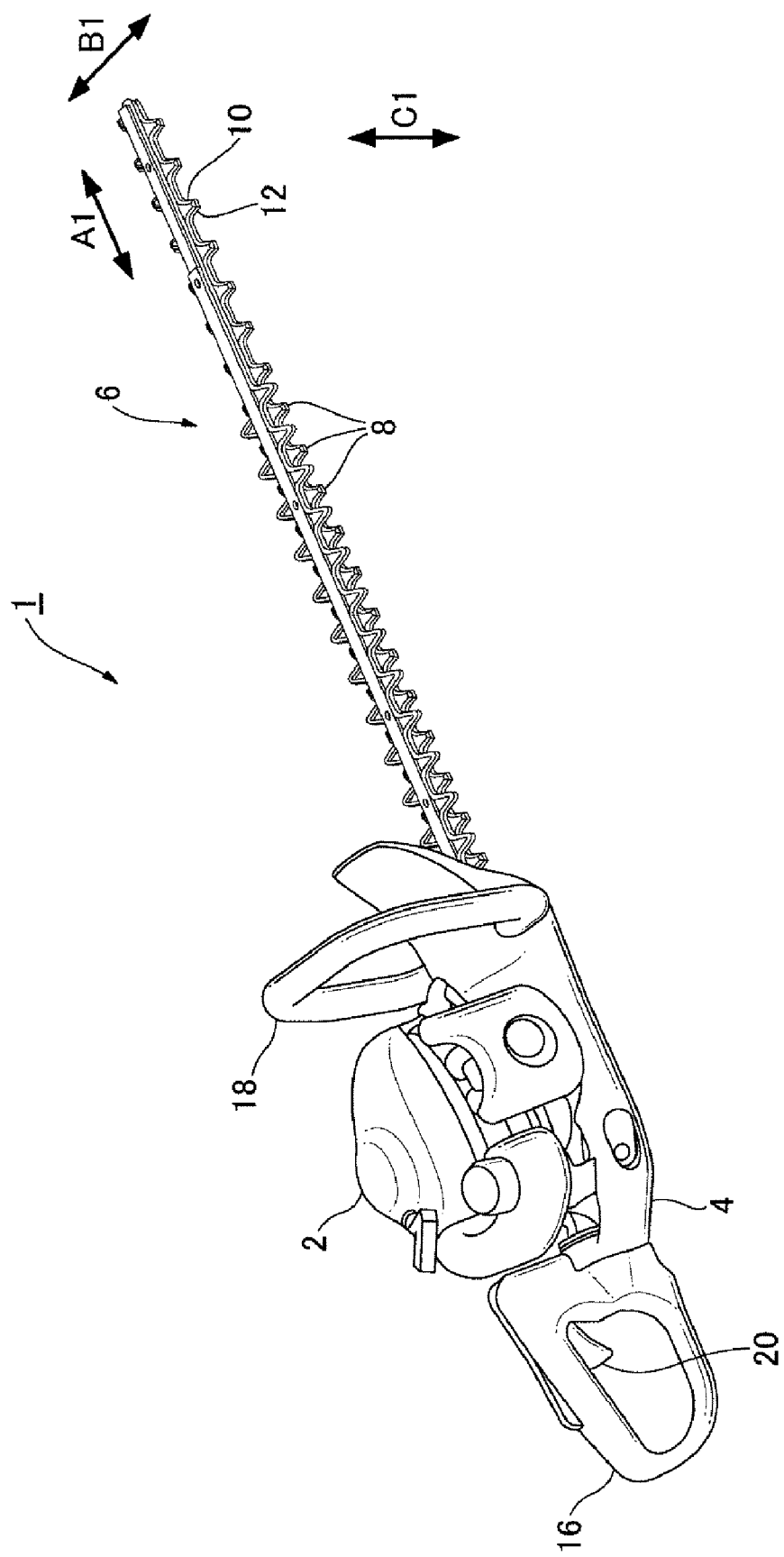
FIG. 1 is a perspective view of a trimming machine according to an embodiment of the present invention.
Figure 2:
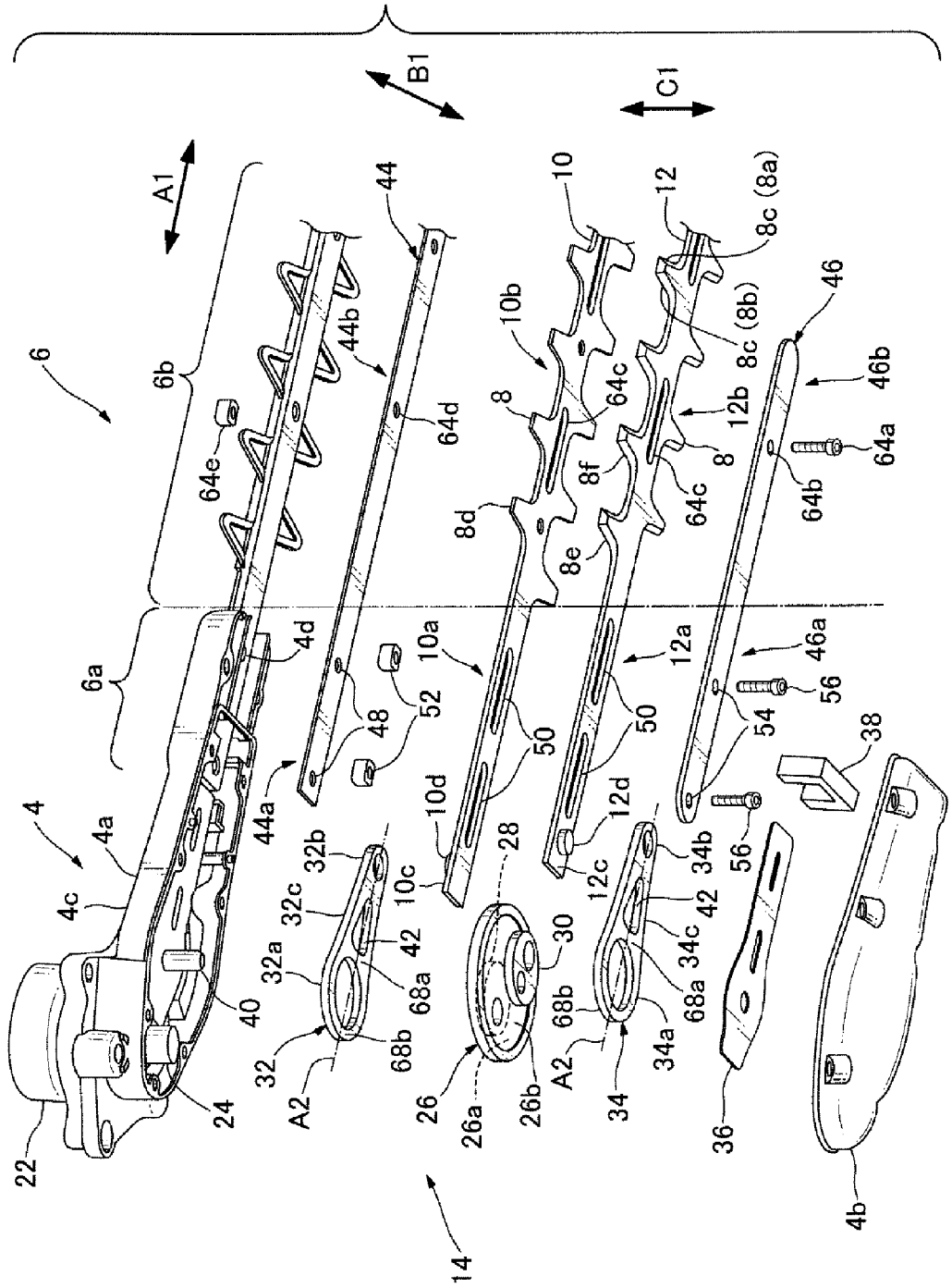
FIG. 2 is an exploded perspective view of a power transmission mechanism of the trimming machine shown in FIG. 1 viewed from the bottom thereof.
Figure 3:
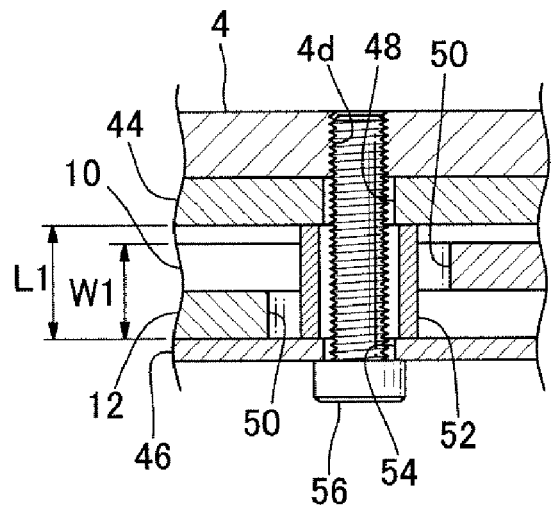
FIG. 3 is a cross-sectional front view of an internal section of a cutter blade assembly of the trimming machine shown in FIG. 1.

Referring to Figures, an embodiment of a trimming machine according to the present invention will now be explained. FIG. 1 is a perspective view of a trimming machine representing an embodiment of the present invention, FIG. 2 is an exploded perspective view of a power transmission mechanism of the trimming machine shown in FIG. 1 viewed from the bottom thereof, and FIG. 3 is a cross-sectional front view of an internal section of a cutter blade assembly shown in FIG. 1. Further, FIGS. 4-7 are bottom views showing a larger gear, an eccentric cam and a connecting rod at zero-degree, 90-degree, 180-degree and 270-degree positions, respectively.

As shown in FIG. 1, a trimming machine 1 representing an embodiment of the present invention has an engine 2 serving as a rotary power unit, a housing 4 on which the engine 2 is mounted, and a cutter blade assembly 6 extending from the housing 4 in a longitudinal direction A1. The cutter blade assembly 6 has a pair of blades 10, 12, each blades 10, 12 having a plurality of cutting edges 8 along the longitudinal direction A1. The blades 10, 12 are overlapped relative to each other and configured to slide and reciprocate in opposite directions relative to each other along the longitudinal direction A1 in order to trim garden trees and so on by means of the cutting edges 8. A power transmission mechanism 14 (see FIG. 2) is provided in the housing 4 for reciprocating the pair of blades 10, 12. Further, the housing 4 is provided with two handles 16, 18 for a user to hold the trimming machine 1 with his/her hands, and one of the handles 16 is provided with a throttle lever 20 for starting or stopping the reciprocating motion of the pair of blades 10, 12 by adjusting a rotational speed of the engine 2.

Hereinafter, a side of the housing 4 along the longitudinal direction A1 is referred to as a rear side, and a side of the cutter blade assembly 6 along the longitudinal direction A1 is referred to as a front side. Further, a direction in which the pair of blades 10, 12 are overlapped relative to each other is referred to as an up-down direction C1, a side of the engine 2 along the up-down direction C1 is referred to as an upper side, and the opposite side therealong is referred to as a lower side. Further, a direction perpendicular to the longitudinal direction A1 and the up-down direction C1 is referred to as a transverse direction B1.

As shown in FIG. 2, the housing 4 has a housing body 4a opening downward and a housing cover 4b. The engine 2 (not shown in FIG. 2) is mounted onto a top surface 4c of the housing body 4a via a centrifugal clutch 22, and the power transmission mechanism 14 has a smaller gear 24 fixed to an output shaft (not shown) of the centrifugal clutch 22, a larger gear 26 mated with the smaller gear 24, an upper eccentric cam 28 and a lower eccentric cam 30 mounted onto the larger gear 26, and an upper connecting rod 32 and a lower connecting rod 34 for respectively connecting the upper eccentric cam 28 and the lower eccentric cam 30 with the cutter blade assembly 6. Further, a plate 36 for supporting the larger gear 26 and a felt member 38 for preventing leakage of grease contained in the housing 4 are provided.

The larger gear 26 is rotatably attached to a rotary shaft 40 fixed to the housing 4 and has a top surface 26a and a bottom surface 26b. On the top and the bottom surfaces 26a, 26b, the upper and the lower eccentric cams 28, 30 are respectively provided, each cam 28, 30 eccentrically located relative to the rotary shaft 40. A phase of the upper eccentric cam 26a is shifted from that of the lower eccentric cam 26b by 180 degrees with respect to the rotary shaft 40. Shapes of the upper and lower eccentric cams 26a, 26b are substantially cylindrical.

Further, the upper and lower connecting rods 32, 34 are respectively disposed on the top and bottom surfaces 26a and 26b of the larger gear 26. The upper connecting rod 32 has an annular larger end part 32a slidably fitted around the upper eccentric cam 28, an annular small end part 32b pivotally attached to the upper blade 10 which is the upper one of the pair of blades 10, 12, and a connecting part 32c connecting the larger end part 32a to the smaller end part 32b. Similarly, the lower connecting rod 34 has an annular larger end part 34a slidably fitted around the lower eccentric cam 30, an annular small end part 34b pivotally attached to the lower blade 12 which is the lower one of the pair of blades 10, 12, and a connecting part 34c connecting the larger end part 34a to the smaller end part 34b. The upper and lower connecting rods 32, 34 have the identical configuration to each other, and each connecting part 32c, 34c has a tapered profile narrowing from the larger end part 32a, 34a toward the smaller end part 32b, 34b, and a substantially triangular through aperture 42.

The cutter blade assembly 6 has an internal section 6a located inside of the housing 4 and an external section 6b extending from the housing 4 along the longitudinal direction A1. The external section 6b has a length, for example, within a range of 600-800 mm.

As shown in FIGS. 2 and 3, the upper blade 10 and the lower blade 12 are overlapped relative to each other, and the pair of blades 10, 12 is interposed between a support plate 44 and a holding plate 46 respectively disposed above and below the pair of blades 10, 12.

The support plate 44 has an internal section 44a fixed inside of the housing 4 and an external section 44b extending from the housing 4 in the longitudinal direction A1. The internal section 44a has two apertures 48 spaced along the longitudinal direction A1 and aligned with two internal threads 4d provided in the housing 4.

The upper and lower blades 10, 12 have respective internal sections 10a, 12a located inside of the housing 4 and respective external sections 10b, 12b extending from the housing 4 in the longitudinal direction A1. The internal sections 10a, 12a have respective elongated apertures 50 aligned with the two apertures 48 of the support plate 44 and extending in the longitudinal direction A1. Collars 52 fitting into the respective elongated apertures 50 are disposed therein so as to allow the upper and lower blades 10, 12 to slide in the longitudinal direction A1 along the collars 52. A length L1 of the collar 52 along the up-down direction is slightly greater than a total thickness W1 of the upper blade 10 and the lower blade 12.

The holding plate 46 has an internal section 46a located inside of the housing 4 and an external section 46b extending from the housing 4 along the longitudinal direction A1. The external section 46b of the holding plate 46 may be shorter than the other external sections 44b, 10b, 12b of the support plate 44, the upper blade 10 and the lower blade 12, and the internal section 46a of the holding plate 46 has two apertures 54 aligned with the two apertures 48.

Screws 56 are inserted through the apertures 54 of the holding plate 46, the collars 52 and the apertures 48 of the support plate 44 and threadably inserted into the internal threads 4d, and thus the holding plate 46, the collar 52 and the support plate 44 are fixed to the housing 4. In contrast, the upper and lower blades 10, 12 interposed between the support plate 44 and the holding plate 46 are guided by the collars 52 and are movable in the longitudinal direction A1. Further, a cylindrical protrusion 10d pivotally fitted to the annular smaller end part 32b of the upper connecting rod 32 is provided at a rear end 10c of the upper blade 10, while a cylindrical protrusion 12d pivotally fitted to the annular smaller end part 34b of the lower connecting rod 34 is provided at a rear end 12c of the lower blade 12. Thus, the upper and the lower blades 10, 12 is configured to reciprocate once or travel back and forth between an forward position 58 (see FIG. 4) and a backward position 60 (see FIG. 6) when the larger gear 26 is rotated by 360 degrees by means of the engine 2. As described above, since the phases of the upper eccentric cam 28 and the lower eccentric cam 30 are shifted from each other by 180 degrees with respect to the rotary shaft 40, the lower blade 12 is moved from the backward position 60 to the forward position 58 while the upper blade 10 is moved from the forward position 58 to the backward position 60, and inversely the lower blade 12 is moved from the forward position 58 to the backward position 60 while the upper blade 10 is moved from the backward position 60 to the forward position 58.

The plurality of cutting edges 8 are disposed in the external section 10b, 12b of the upper and the lower blades 10, 12 along the longitudinal direction A1. In this embodiment, the cutting edges 8 are disposed in both sides of the longitudinal direction A1, each cutting edge 8 having cutting edge portions 8c on a front face 8a and a rear face 8b thereof.

The cutting edges 8 are disposed so that, when the upper blade 10 is moved from the forward position 58 to the backward position 60 and the lower blade 12 is moved from the backward position 60 to the forward position 58, the cutting edge 8 of the upper blade 10 such as the cutting edge 8d is engaged with the cutting edge 8 of the lower blade 12 such as the cutting edge 8e which is rearwardly adjacent to the cutting edge 8 of the upper blade 10 in order to perform a cutting action. Further, the cutting edges 8 are disposed so that, when the upper blade 10 is moved from the backward position 60 to the forward position 58 and the lower blade 12 is moved from the forward position 58 to the backward position 60, the cutting edge 8 of the upper blade 10 such as the cutting edge 8d is engaged with the cutting edge 8 of the lower blade 12 such as the cutting edge 8f which is forewardly adjacent to the cutting edge 8 of the upper blade 10 in order to perform a cutting action.

In the external section 6b of the cutter blade assembly 6, the pair of blades 10, 12 is appropriately held so that a gap therebetween can be adjusted. For example, by inserting a screw 64a through a washer (not shown) or a aperture 64b of the holding plate 46 and the elongated apertures 64c of the upper and lower blades 10, 12 into the internal thread 64d of the support plate 44 and using a lock nut 64e for preventing the screw 64a from loosing, the pair of blades 10, 12 may be held so that the gap therebetween can be adjusted.

Figure 4:
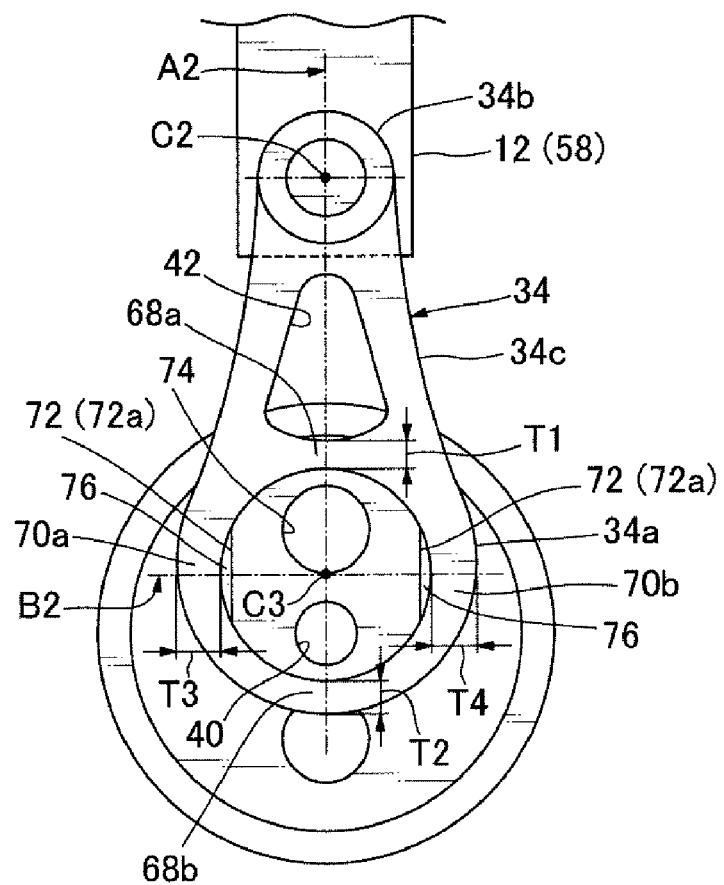
FIG. 4 is a bottom view showing a larger gear, an eccentric cam and a connecting rod at a zero-degree position.
Figure 5:
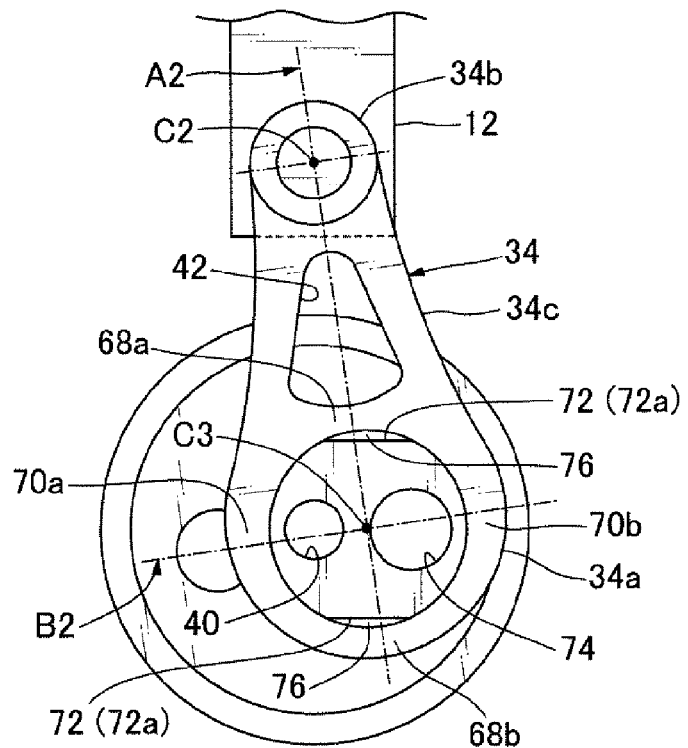
FIG. 5 is a bottom view showing a larger gear, an eccentric cam and a connecting rod at a 90-degree position.
Figure 6:
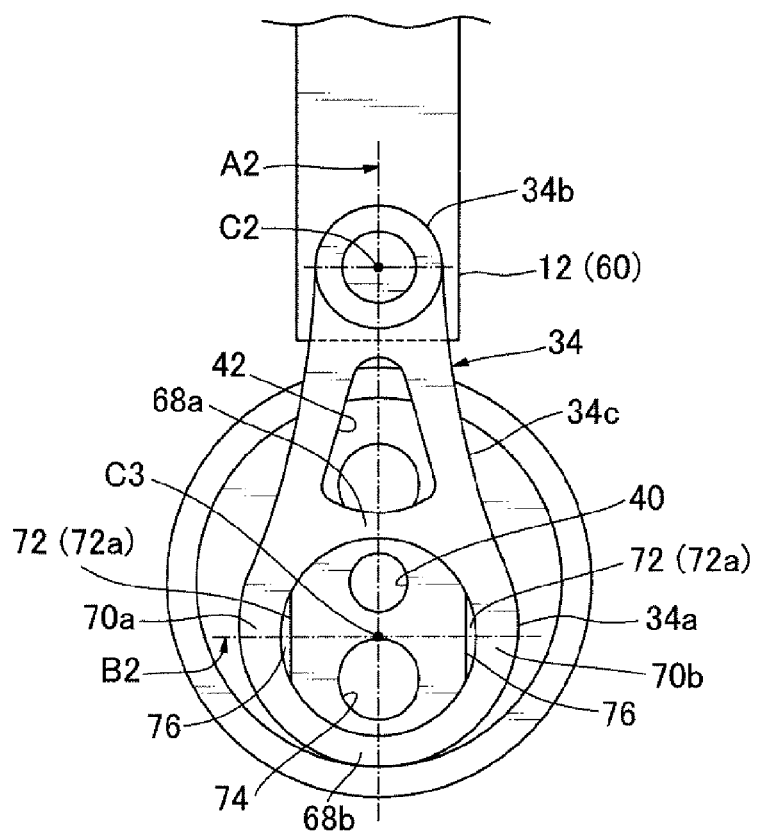
FIG. 6 is a bottom view showing a larger gear, an eccentric cam and a connecting rod at a 180-degree position.
Figure 7:
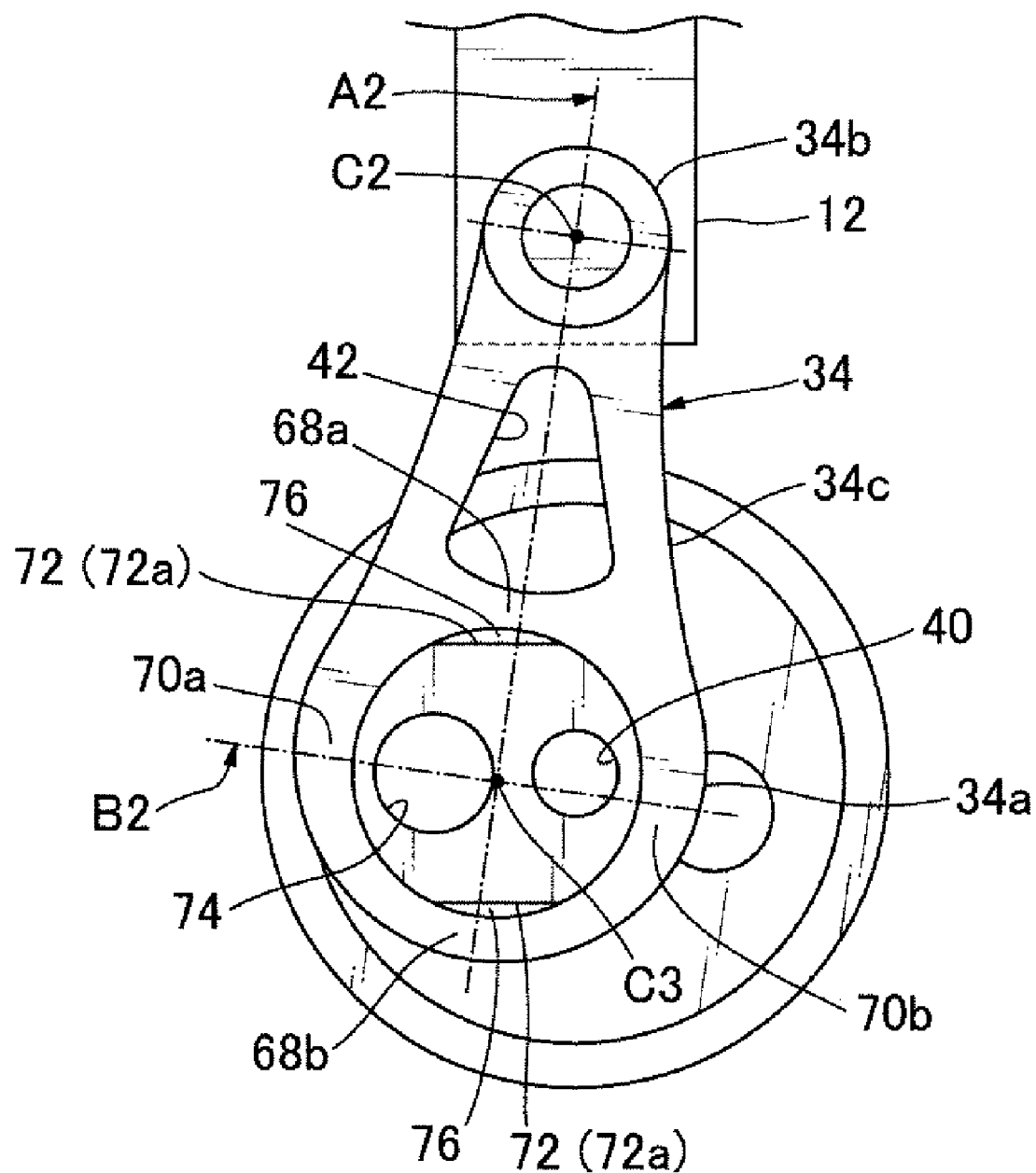
FIG. 7 is a bottom view showing a larger gear, an eccentric cam and a connecting rod at a 270-degree position.

FIG. 4 shows a state of the lower blade 12 in which it has been moved to the most forward position, namely, the forward position 58, and a rotational position of the larger gear 26 and the lower eccentric cam 30 in this state is referred to as a zero-degree position. FIGS. 5-7 show states in which the larger gear 26 and the lower eccentric cam 30 are respectively rotated by 90 degrees, 180 degrees and 270 degrees from the state shown in FIG. 4. Accordingly, FIG. 6 shows of a state of the lower blade in which it has been moved to the most rearward position, namely, the rearward position 60. It should be noted that the upper eccentric cam 28 and the upper blade 10 have respectively structures similar to those of the lower eccentric cam 30 and the lower blade 12 except that the phases of the upper eccentric cam 28 and the upper blade 10 are shifted by 180 degrees from those of the lower eccentric cam 30 and the lower blade 12. Thus, hereinafter, only the lower eccentric cam 30 and the lower blade 12 will be explained, namely, illustration and explanation about the upper eccentric cam 28 and the upper blade 10 are omitted.

As shown in FIG. 4, the lower connecting rod 34 has a connecting rod axis A2 passing through the central axis C2 of the smaller end part 34b and the central axis C3 of the larger end part 34a, and a transverse axis B2 passing through the central axis C3 of the larger end part 34a and extending perpendicular to the connecting rod axis A2 and the central axis C3 of the larger end part 34a.

The larger end part 34a has a front bearing portion 68a and a rear bearing portion 68b located on the connecting rod axis A2, and side portions 70a, 70b located on the transverse axis B2. The bearing portions 68a, 68b are configured to be deformed in the direction of the connecting rod axis A2. Specifically, the lower connecting rod 34 and the lower eccentric cam 30 are made of iron, and the bearing portions 68a, 68b have respective radial widths T1, T2 that are smaller than radial widths T3, T4 of the side portions 70a, 70b.

The lower eccentric cam 30 has peripheral cutouts 72 located on the transverse axis B2 when the connecting rod axis A2 is aligned with the longitudinal direction A1, and a through aperture 74. Each peripheral cutout 72 has a surface 72a located parallel to the connecting rod axis A2 when the connecting rod axis A2 is aligned with the longitudinal direction A1. The through aperture 74 and the peripheral cutouts 72 define spaces 76 for storing grease between the larger end part 34a of the lower connecting rod 34 and the lower eccentric cam 30.

An operation of the trimming machine 1 which is the embodiment of the present invention will now be described.

The engine 2 is actuated and then the centrifugal clutch 22 is actuated by means of the throttle lever 20 so that the smaller gear 24 and the larger gear 26 are rotated. The rotation of the larger gear 26 causes the upper eccentric cam 28 and the lower eccentric cam 30 to be rotated around the rotary shaft 40 so that the larger end parts 32a, 34a of the upper and lower connecting rods 32, 34 are rotated. According to this rotation, the smaller end parts 32b, 34b of the upper and lower connecting rods 32, 34 causes the upper and lower blades 10, 12 to be reciprocated along the collars 52, namely, in the longitudinal direction A1.

Since the phase of the upper eccentric cam 28 is shifted from that of the lower eccentric cam 30 by 180 degrees, while the upper blade 10 is moved from the backward position 60 to the forward position 58 thereof, the lower blade 12 is moved from the forward position 58 to the backward position 60 thereof. This causes the cutting edges 8 (8d) of the upper blade 10 and the cutting edges 8 (8f) of the lower blade 12 to perform cutting action. Subsequently, while the upper blade 10 is moved from the forward position 58 to the backward position 60 thereof, the lower blade 12 is moved from the backward position 60 to the forward position 58 thereof. This causes the cutting edges 8 (8d) of the upper blade 10 and the cutting edges 8 (8e) of the lower blade 12 to perform cutting action. Since the operation of the upper blade 10 is similar to that of the lower blade 12, only the operation of the lower blade 12 will be explained below, namely, explanation about the operation of the upper blade is omitted.

When the lower blade 12 is moved from the forward position 58 to the backward position 60, the lower blade 12 is subject to cutting load, especially just before the backward position 60. Thus, a force is applied to the lower eccentric cam 30 in a direction of resisting the lower eccentric cam 30 from being rotated from forward to backward. Namely, the rear bearing portion 68b of the lower connecting rod 34 is pressed against the lower eccentric cam 30. As stated above, such a force becomes large when and just before the connecting rod axis A2 is aligned with the longitudinal direction A1. Thus, such a force causes the rear bearing portion 68b to be deformed in the direction of the connecting rod axis A2 so that a contact area between the rear bearing portion 68b and the lower eccentric cam 30 is circumferentially expanded or increased. As a result, a pressure acting on the lower eccentric cam 30 is reduced so that wear caused between the larger end part 34a of the lower connecting rod 34 and the lower eccentric cam 30 can be reduced.

Further, when the lower blade 12 is moved from the backward position 60 to the forward position 58, the lower blade 12 is subject to cutting load, especially just before the forward position 58. Thus a force is applied to the lower eccentric cam 30 in a direction of resisting the lower eccentric cam 30 from being rotated from backward to forward. Namely, the front bearing portion 68a of the lower connecting rod 34 is pressed against the lower eccentric cam 30. As stated above, such a force becomes large when and just before the connecting rod axis A2 is aligned with the longitudinal direction A1. Thus, such a force causes the front bearing portion 68a to be deformed in the direction of the connecting rod axis A2 so that a contact area between the front bearing portion 68a and the lower eccentric cam 30 is circumferentially expanded or increased. As a result, a pressure acting on the lower eccentric cam 30 is reduced so that wear caused between the larger end part 34a of the lower connecting rod 34 and the lower eccentric cam 30 can be reduced.

On the other hand, during a substantially entire period in which the lower blade 12 is moved from the forward position 58 to the backward position 60 and during a substantially entire period in which it moves from the backward position 60 to the forward position 58, tension force is applied to the side portions 70a, 70b of the larger end part 32a. Since the side portions 70a, 70b of the larger end part 34a have large widths so as to minimize deformation thereof, which is similar to the prior-art trimming machines, the lower blade 12 can be stably reciprocated.

Further, since the forces applied to the bearing portions 68a, 68b in the direction of the connecting rod axis A2 are relatively small during a substantially entire period in which the lower blade 12 is moved from the forward position 58 to the backward position 60 and during a substantially entire period in which it is moved from the backward position 60 to the forward position 58, the lower eccentric cam 30 does not need to contact the bearing portions 68a, 68b. Thus, the lower eccentric cam 30 of the present embodiment is allowed to have the peripheral cutout 72 at locations adjacent to the bearing portions 68a, 68b when the lower eccentric cam 30 is in the 90-degree position (see FIG. 5) or in the 270-degree position (see FIG. 7), namely, at locations on the transverse axis B2 when the connecting rod axis A2 is aligned with the longitudinal direction A1 (see FIGS. 4 and 6). Thus, grease can be stored in the spaces 76 created by the above-stated cutouts so that lubrication between the larger end part 34a of the lower connecting rod 34 and the lower eccentric cam 30 can be promoted to reduce wear caused therebetween. Further, by forming the through aperture 42 in the upper and the lower connecting rod 32, 34 as well as the through aperture 74 in the upper and the lower eccentric cam 28, 30, a weight of the power transmission mechanism 14 can be reduced. Further, by filling the through aperture 42, 74 with grease, wear caused between the larger end part 34a and the lower eccentric cam 30 can be reduced.

Preferably, the peripheral cutouts 72 may be configured so that the pressure acting between the larger end part 34a of the lower connecting rod 34 and the lower eccentric cam 30 is constant during the lower eccentric cam 30 is rotated by 360 degrees.

Although the preferred embodiment of the present invention has been described, the present invention is not limited to the above-stated embodiment, namely, the embodiment can be modified variously within the scope of the present invention. Thus, it is apparent that such modifications fall within the scope of the present invention.

Further, in the above-stated embodiment, although both of the upper and lower blades 10, 12 are reciprocated, only one of them may be reciprocated.

What is claimed is:

1. A trimming machine having a pair of blades each of which has a plurality of trimming edges along a longitudinal direction of the blades and which are reciprocated along the longitudinal direction relative to each other by a rotary power unit, comprising:
   a substantially cylindrical eccentric cam eccentrically rotated by the rotary power unit; and
   a connecting rod having an annular larger end part slidably fitted around the eccentric cam, a smaller end part pivotally attached to one of the blades, a connecting rod axis passing through a central axis of the smaller end part and a central axis of the larger end part, and a transverse axis passing through the central axis of the larger end part and extending perpendicular to the connecting rod axis and the central axis of the larger end part,
   wherein the eccentric cam has a peripheral cutout located on the transverse axis when the connecting rod axis is aligned with the longitudinal direction.

2. The trimming machine according to claim 1,
   wherein the larger end part has a bearing portion located on the connecting rod axis for bearing load from the blade when the connecting rod axis is aligned with the longitudinal direction, and the bearing portion is deformable along the connecting rod axis when the bearing portion is subjected to the load.

3. The trimming machine according to claim 2,
   wherein the larger end part has a side portion located on the transverse axis, and
   a radial width of the bearing portion is smaller than a radial width of the side portion.

* * * * *